United States Patent

Harcombe

[11] Patent Number: 5,803,049
[45] Date of Patent: Sep. 8, 1998

[54] FUEL SYSTEM

[75] Inventor: Anthony Thomas Harcombe, Richmond, United Kingdom

[73] Assignee: Lucas Industries, United Kingdom

[21] Appl. No.: 952,233

[22] PCT Filed: May 9, 1996

[86] PCT No.: PCT/GB96/01106

§ 371 Date: Feb. 17, 1998

§ 102(e) Date: Feb. 17, 1998

[87] PCT Pub. No.: WO96/35867

PCT Pub. Date: Nov. 14, 1996

[30] Foreign Application Priority Data

May 12, 1995 [GB] United Kingdom ................... 9509610

[51] Int. Cl.$^6$ ................................................. F02D 41/20
[52] U.S. Cl. ........................... 123/446; 123/506; 123/299; 361/154
[58] Field of Search ..................................... 123/506, 458, 123/299, 300; 251/129.15; 361/144, 154, 160, 206

[56] References Cited

U.S. PATENT DOCUMENTS

| 4,225,898 | 9/1980 | Weber et al. | 361/154 |
| 4,234,903 | 11/1980 | Harper | 361/154 |
| 4,491,113 | 1/1985 | Gassler et al. | 123/490 |
| 4,509,487 | 4/1985 | Mowbray | 123/458 |
| 5,381,297 | 1/1995 | Weber | 361/154 |
| 5,668,476 | 9/1997 | Archer | 361/154 |
| 5,706,778 | 1/1998 | Kapus | 123/299 |

*Primary Examiner*—Thomas N. Moulis
*Attorney, Agent, or Firm*—Price, Heneveld, Cooper, DeWitt & Litton

[57] ABSTRACT

An engine fuel system including a solenoid actuated fuel control valve (16) which is energized to cause fuel delivery to the associated engine. The valve is initially closed to achieve pilot delivery of fuel by a high current pulse supplied to the solenoid winding (7) and is then allowed to open under the influence of a spring, the opening movement of the valve member being controlled by supplying current to the solenoid winding. Finally by supplying further current to the winding the valve member is closed to achieve closure of the valve for the main delivery of fuel.

11 Claims, 2 Drawing Sheets

FUEL SYSTEM

This invention relates to a control system for an electromagnetically operable valve more particularly a fuel delivery control valve of a fuel injection system for a compression ignition engine.

One example of a fuel injection system incorporating the control valve comprises a cam actuated high pressure fuel pump having an outlet connected to the inlet of an injection nozzle which incorporates a fuel pressure actuated valve member. The control valve is connected between the outlet and a drain so that when the valve is closed the fuel delivered by the pump will be supplied to the injection nozzle and delivered to the associated engine. The control valve includes a valve member which is spring biased to the open position and the associated actuator is energised to move the valve member to the closed position against the action of the spring.

In order to minimise engine noise the usual practice is to deliver a small quantity of fuel at a reduced rate in advance of the main quantity of fuel, to the injection nozzle. The small quantity or pilot quantity, is achieved by closing the control valve and then re-opening the valve before re-closing the valve to obtain the main delivery of fuel.

In the examples described when the control valve is opened the pressure in the fuel column between the control valve and the nozzle falls towards the drain pressure. As a result when the control valve is re-energised to obtain the main delivery of fuel re-pressurisation of the column of fuel has to take place before the valve member of the nozzle can start to move to the open position. The effective separation between the end of delivery of the pilot quantity and the commencement of delivery of the main quantity of fuel therefore includes the period required to re-pressurise the fuel column.

As with all electromagnetically operable devices the valve member takes some time to move forward to its final position against the action of its spring when electric current is supplied to the actuator and in addition, it takes some time to return to its original position under the action of the spring, when the supply of current to the actuator is discontinued. There is therefore a minimum period between the end of the delivery of the pilot quantity of fuel and the commencement of delivery of the main quantity of fuel if the forward and return movements of the valve member are not to overlap, the period for re-pressurising the fuel column forming part of the aforesaid minimum period.

According to one aspect of the invention it is proposed by supplying current to the actuator from a source of supply, to control the movement of the valve member under the action of its spring following the delivery of the pilot quantity of fuel thereby to control the depressurisation of the fuel column prior to re-establishing the current flow from the source of supply to achieve delivery of the main quantity of fuel.

The minimum period required for a cycle of operation of the control valve also means that there is a minimum pilot quantity of fuel which can be supplied to the engine. It has been the practice to control the profile of the current pulse which is applied to the actuator to effect movement of the valve member against the action of the spring, to minimise so far as is possible, any bounce when the valve member reaches its final position. Moreover, the profile of the current pulse has been such as to provide an opportunity to detect when the valve member reaches its final position.

According to another aspect of the invention the initial current flow in the actuator for the purpose of achieving movement of the valve member against the action of the spring is sufficiently high as to cause bounce of the valve member and the decay of current flow following the initial current flow is controlled to control the de-pressurisation of the fuel column intermediate the control valve and the nozzle.

Figure 1:
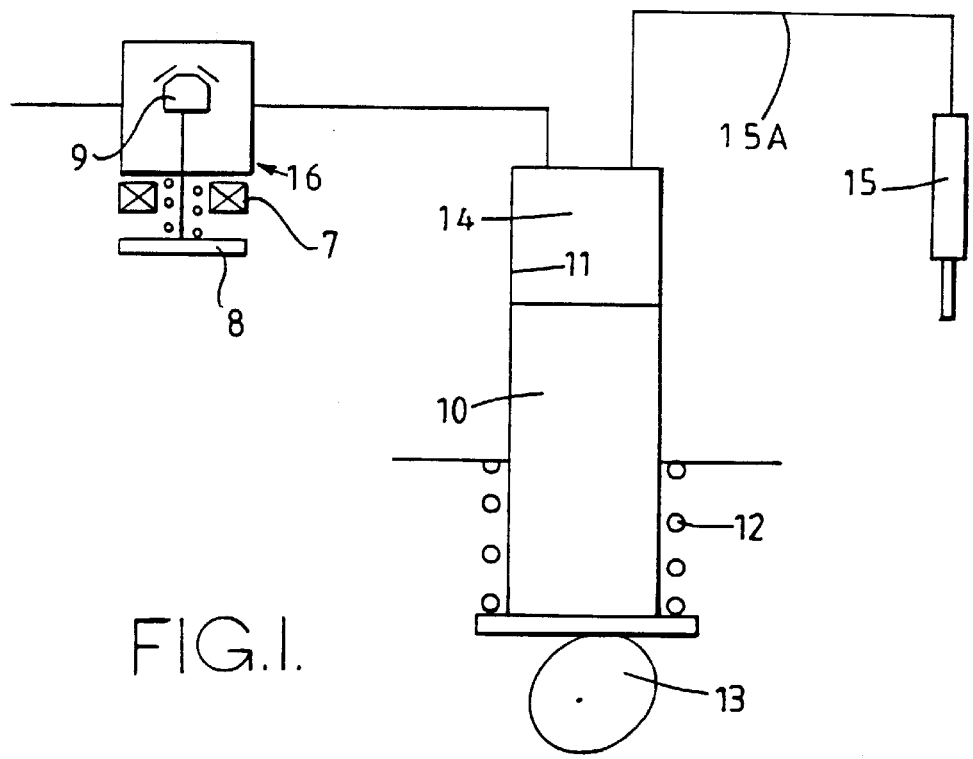
FIG. 1 is a diagrammatic drawing of a typical fuel injection system.

Referring to FIG. 1 the fuel injection system comprises a high pressure pump including a plunger 10 which is slidable in a bore 11. The plunger is driven inwardly against the action of a spring 12 by an engine driven cam 13. The plunger and bore define a pumping chamber 14 which is provided with an outlet connected directly through a pipeline 15A to a fuel injection nozzle 15, the nozzle having a fuel pressure actuated spring loaded valve member of the inwardly opening type. The pumping chamber 14 also communicates with a drain by way of a spill control valve 16 which includes a spill valve member 9 coupled to an armature 8 of an electromagnetic actuator. The spill valve member is spring biased to the open position and is moved to its closed position into engagement with a seating when electric current is supplied to the control winding 7 of the actuator. In use, assuming that the pumping chamber is full of fuel, during inward movement of the plunger 10 fuel will be displaced from the pumping chamber and if the spill valve 16 is closed will flow to the nozzle and be delivered to the associated engine. If the spill valve is open the fuel will flow to a drain and the pressure in the pipeline 15A connecting the pumping chamber with the injection nozzle and also the passage connecting the pumping chamber with the spill valve will fall to the pressure of the drain. The pumping chamber 14 may be filled through the spill valve 16 from a low pressure source of fuel. Conveniently the injection nozzle 15 and the spill valve 16 are mounted on the same body as that which contains the high pressure pump the combination being known as a pump/injector.

Figure 2:
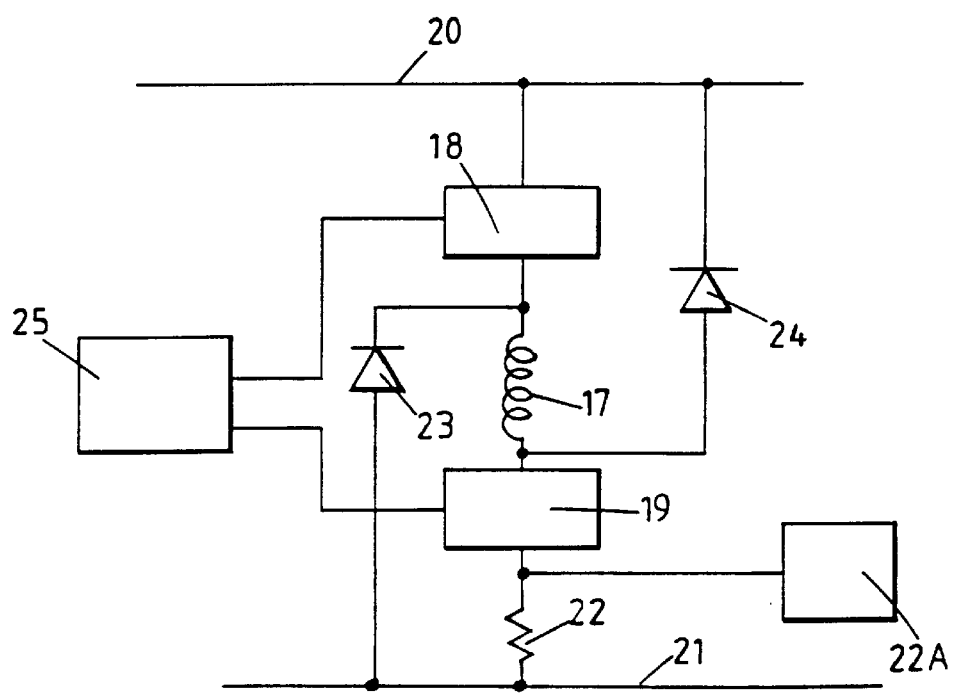
FIG. 2 is a circuit diagram of a control circuit for a valve forming part of the system.

The control winding is supplied with current under the control of a power circuit an example of which is shown in FIG. 2.

In FIG. 2 the control winding is shown at 17 and has its opposite ends connected through controllable switches 18, 19 to positive and negative supply lines 20, 21 respectively. A current sensing resistor 22 is interposed between the switch 19 and the supply line 21 and the junction of the winding 17 and the switch 18 is connected to the cathode of a first flywheel diode 23 the anode of which is connected to supply line 21. A further flywheel diode 24 is provided having its cathode connected to the supply line 20 and its anode connected to the junction of the winding 17 and the switch 19. The conductive states of the switches 18 and 19 are controlled by a logic circuit 25 and the voltage which is developed across the resistor 22 is applied to a sensing circuit 22A which may include a differentiating circuit.

In operation, when it is required to close the spill valve 16 both switches 18 and 19 are turned on in order to achieve a rapid rise in the current flow in the winding. When the current reaches a peak value the switch 18 is opened to disconnect the winding from the supply. The current in the winding is allowed to decay firstly at a low rate through the flywheel diode 23 and then when the switch 19 is opened, at a higher rate through both diodes and the supply. Before the current falls to zero and before the valve member has moved to its fully closed position both switches are closed for a short period to increase the current flow by a small amount and the switch 18 is opened so that the current decays at a low rate. During this period of decay the valve member is brought to rest by engagement with its seating and a small glitch occurs in the current waveform. This glitch is detected by the current sensing circuit 22A. Following the glitch or a predetermined time after opening the switch 18, it is re-losed and then switched to maintain a mean level of holding current for so long as it is required to maintain the spill valve closed.

When it is required to terminate delivery of fuel both switches are turned off to allow the current in the winding to decay at a high rate. When the flux in the core of the winding has fallen to a sufficiently low value the valve member of the spill valve 16 and the armature will move under the action of the spring to the fully open position of the valve and it is possible to detect the fully open position by restoring a small current flow and then allowing the current to decay, an opening glitch by careful design, appearing on the decaying current curve.

Figure 3:
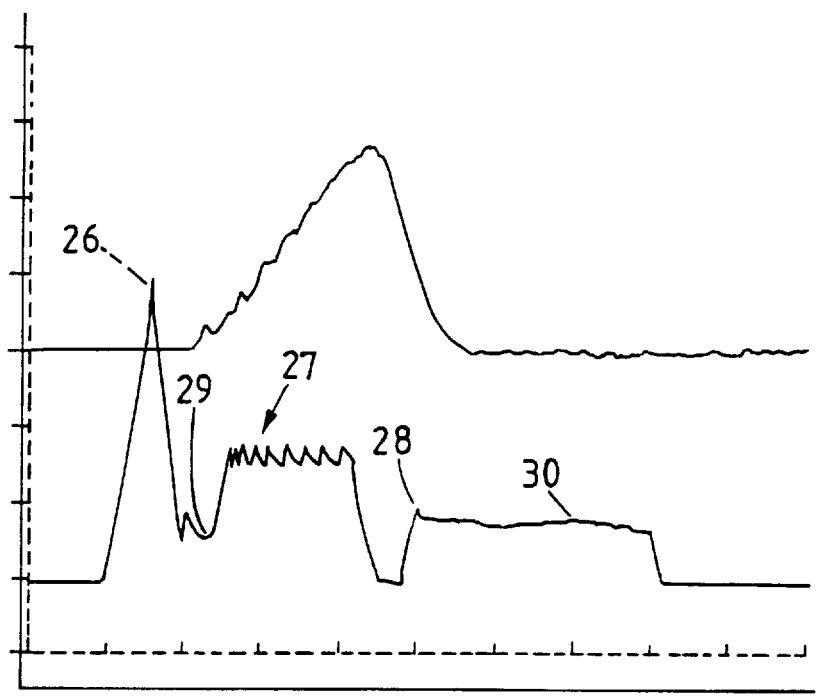
FIGS. 3 and 4 are diagrams showing the fuel pressure and current changes in the fuel system and the control circuit.

The current profile in the winding is seen in the lower curve of FIG. 3 the upper curve showing the pressure in the pumping chamber. In FIG. 3 the reference numeral 26 represents the initial peak value of the current, 27 shows the current fluctuation to achieve the holding current and 28 shows the small current flow initiated for the purpose of detecting opening of the spill valve. The valve closed glitch is seen at 29 and the valve open glitch is seen at 30. A suitable logic circuit for controlling the operation of the switches 18 and 19 is seen in our copending application PCT/GB95/02425 (WO96/12098) which also provides for controlling the operation of a further pump/injector of the engine.

The movement of the valve member of the spill valve towards the closed position starts to take place at or about the time the current reaches its peak value and its movement is completed just after the pressure in the pumping chamber starts to rise. This is because some pressurisation of the fuel takes place before the valve member attains its fully closed position. Opening of the valve takes place soon after the current starts to decay from its hold value and is completed just after the pressure in the pumping chamber has fallen to drain or filling pressure.

The above describes the sequence of events to provide a single shot of fuel to the associated engine. When pilot injection of fuel is required and there is adequate time available, the sequence of events as described takes place although for pilot injection since a reduced quantity of fuel will be required the "hold" period will be considerably reduced and the peak pressure attained will be reduced although it will be appreciated that sufficient fuel pressure must be generated in the pump chamber to lift the valve member of the fuel injection nozzle from its seating. The sequence of events as described with a longer "hold" period, can then take place for the main delivery of fuel.

As the required time separation between the pilot quantity of fuel and the main quantity of fuel is reduced the two sequences will start to run into each other, in other words the sequence for the main delivery of fuel will have to start before the sequence for pilot delivery has finished. The small current flow 28 for the opening glitch 30 can be deleted from the pilot sequence since this glitch is only used to check the performance of the spill valve throughout its life. The elimination of the current flow 28 allows the sequence for the main fuel delivery to start earlier thereby allowing the separation between the pilot delivery and the main delivery to be reduced.

A further reduction in the separation of the pilot quantity and the main quantity of fuel can be obtained by controlling the opening of the spill valve. It will be appreciated that if the pressure of fuel in the pumping chamber, the internal passages of the nozzle and the spill valve and the passages connecting the spill valve and nozzle to the pumping chamber is allowed to fall practically to zero between the pilot and main delivery then an appreciable portion of the stroke of the pumping plunger following spill valve closure will be required to repressurise the fuel. As will be explained by controlling the opening movement of the spill valve, so that the valve member 9 moves only a limited extent away from the seating in the time available, the depressurization of the fuel can be controlled and this means that the main delivery of fuel will take place earlier following closure of the spill valve. The fuel does have to be depressurised to a level which is below the nozzle closing pressure.

In order to control the opening movement of the valve member, both switches 18, 19 are closed to effect an increase in the current flowing in the winding during movement of the valve member to the open position. This has the effect of slowing down the opening movement and hence the decay of the fuel pressure in the pumping chamber and the associated passages.

Figure 4:
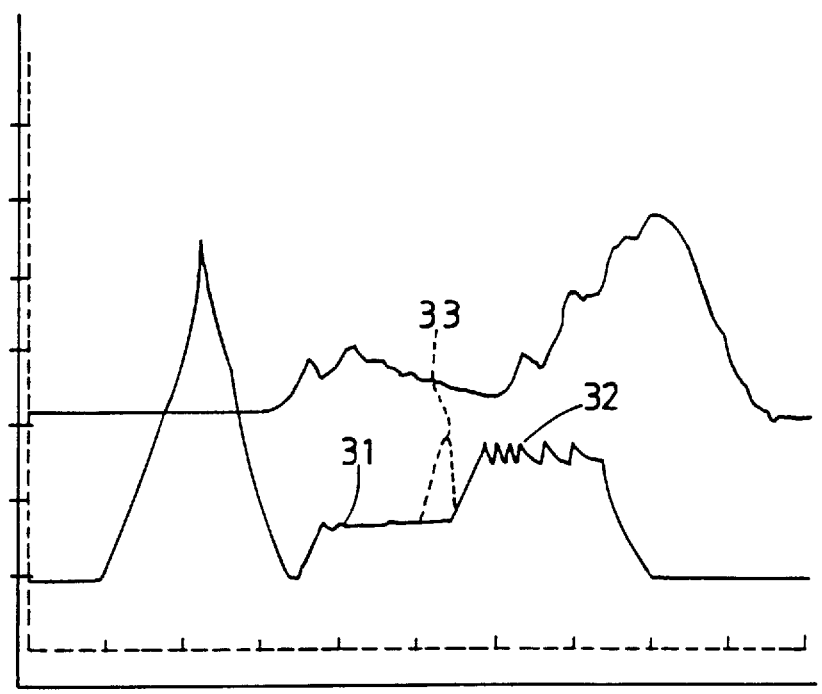

If both switches remained closed the current would rise to the peak value 26 as shown in FIG. 3. It will therefore be necessary to limit the current to a lower value as shown at 31 in FIG. 4. This is achieved by allowing the current to decay freely from the peak value, closing the switches to achieve the current level shown at 31 and then allowing the current to decay freely by opening both switches. In practice the current level 31 is maintained by the generated E.M.F. as the valve member moves towards the open position. In some cases depending on the spill valve and actuator design if the current is then increased to the hold value 32 as shown in FIG. 4 the valve member will move to the closed position for the main delivery of fuel. In other cases it may be necessary to inject a pulse of current to achieve closure of the valve, prior to allowing the current to settle at the hold value 32, to maintain the valve in the closed position. Such a pulse of current is seen in dotted outline in FIG. 4 at 33. The intermediate peak value of the current pulse depends on the design of the control valve. In practice the magnitude of the current level 31 may be controlled so that the rate at which the valve opens and hence the pressure decay can be controlled. The effect of the additional current flow as described above is to slow the rate at which the valve member would attain its fully open position. The flow of current is such as to prevent the valve member reaching its fully open position.

The influence of the current flow on the opening rate can be "learnt" by testing during periods of engine operation when there is plenty of time between the pilot and main injection quantities. During such periods the effect of different magnitudes of current flow can be assessed by observing the valve open glitch 30 seen in FIG. 3.

The circuit described in our copending application can be modified to provide the above described operating sequence.

As previously mentioned the normal practice when operating the spill valve is to arrange that the valve member closes onto its seating in such a manner that there is minimum bounce. This results in a finite time for closing and re-opening of the spill valve during which time a volume of fuel will be delivered to the engine. In order to reduce this volume of fuel for pilot injection purposes it is proposed to energise the winding in such a manner that bounce of the valve member takes place. This is achieved by turning both switches 18 and 19 on and allowing the current to rise to a higher value than the peak value 26 shown in FIG. 3, and then turning both switches off. The effect will be that the valve member will accelerate quickly, impact the seat and bounce off. During the periods just before and after valve closure and the instant of valve closure the fuel in the pumping chamber 14 will be pressurised and a small quantity of fuel delivered to the engine. The return motion of the valve member may be controlled as described above in order to control the depressurisation of the fuel so that the interval between pilot delivery and the main delivery of fuel can be further minimised.

I claim:

1. A method of controlling the flow of current in a winding which forms part of a fuel delivery control valve of an engine fuel system, the valve further including an armature which is coupled to a valve member, the armature and valve member being movable by the magnetic field produced by the winding from a rest position at which there is no flow of fuel to the associated engine towards an actuated position at which fuel is delivered to the associated engine, the valve including a spring which biases the armature and valve member to the rest position, the method comprising connecting the winding to a source of electric supply and allowing the current in the winding to rise to a peak value during which time the armature and valve member start to move from the rest position towards the actuated position, disconnecting the winding from the source of supply and allowing the current in the winding to fall at a high rate during which period the armature and valve member attain the actuated position and start to return to the rest position, reconnecting the winding to a source of electric supply and allowing the current flow to increase to a low value to control the movement of the armature and valve member towards the rest position and then further increasing the current flow to effect movement of the armature and valve member to the actuated position.

2. A method according to claim 1 characterised in that the current is increased from said low value to a holding value to move the valve member to and retain the valve member in the actuated position.

3. A method according to claim 1 characterised in that the current is increased from said low value to an intermediate peak value to move the valve member to the actuated position following which the current is maintained at a holding value to retain the valve member in the actuated position.

4. A method according to claim 1 characterised in that said low value of current is determined by assessment of the rate of movement of the valve member to its rest position for different values of said current utilising a signal obtained when the valve member is allowed to attain the rest position.

5. A method of controlling the operation of a fuel delivery control valve of an engine fuel system so as to achieve pilot delivery of fuel to the associated engine followed by main delivery of fuel to the engine, the control valve including a valve member, an armature coupled to the valve member, a spring which biases the valve member towards a rest position in which there is no flow of fuel to the associated engine, from an actuated position in which fuel flow can take place to the engine, an electric winding which when supplied with electric current generates a magnetic field which acts on the armature to generate a force acting in opposition to said spring, the method comprising supplying electric current from a source of supply to the winding to initiate movement of the valve member to the actuated position, disconnecting the winding from the source of supply and allowing the valve member to continue its movement to the actuated position to provide pilot delivery of fuel and then to start moving to the rest position under the action of the spring, supplying current to the winding to control the movement of the valve member towards the rest position and increasing the flow of current in the winding to effect movement of the valve member to the actuated position to effect the main delivery of fuel to the engine.

6. A method according to claim 5 in which the supply of current to the winding in order to control the movement of the valve member is such as to prevent the valve member reaching the rest position prior to increasing the flow of current to obtain the main delivery of fuel to the engine.

7. A fuel system for an internal combustion engine comprising an engine cam actuated pumping plunger housed within a bore having an outlet connected to a fuel injection nozzle and a fuel delivery control valve including a winding, a valve member, an armature coupled to the valve member and movable against the action of a spring to close the control valve to allow delivery of fuel to the associated engine, when electric current is supplied to the winding, the fuel system further including circuit means for controlling the flow of electric current in said winding, said circuit means acting in sequence when pilot delivery of fuel to the associated engine is required followed by the main delivery of fuel, to connect the winding to a source of electric supply so that the current in the winding rises to a peak value during which time the armature and valve member start to move from a rest position to close the valve, to disconnect the winding from the source of supply and to allow the current to fall at a high rate during which period the valve is closed and starts to reopen thereby causing delivery of the pilot quantity of fuel, to reconnect the winding to a source of electric supply to allow the current flow to increase to a low value to control the rate at which the control valve is opened, and to further increase the current flow to cause closure of the valve to achieve delivery of the main quantity of fuel to the engine, the winding being disconnected from the source of supply when the desired quantity of fuel has been supplied to the engine.

8. A fuel system for an internal combustion engine comprising an engine cam actuated pumping plunger housed within a bore having an outlet connected to a fuel injection nozzle and a fuel delivery control valve including a winding, a valve member movable from a rest position into engagement with a seating to close the control valve to allow fuel delivery to the associated engine, an armature coupled to the valve member, the armature being responsive to the magnetic field produced by the winding and acting under the influence of the magnetic field to close the valve, the fuel system further including circuit means for controlling the flow of electric current in the winding, the circuit means acting when pilot delivery of fuel is required to connect said winding to a source of electric supply and to allow the current flow to rise to a high value so that the valve member impacts the seating and bounces therefrom, the momentary period of valve closure providing the pilot delivery of fuel.

9. A fuel system according to claim 8, in which said circuit means acts to control the movement of the valve member away from the seating by allowing the current to decay at a high rate and then reconnecting the winding to a source of supply and allowing the current to rise to a low value.

10. A fuel system according to claim 7 in which the level of current applied to the winding following the pilot delivery of fuel is such as to prevent the valve member reaching its rest position.

11. A fuel system according to claim 9 in which the level of current applied to the winding following the pilot delivery of fuel is such as to prevent the valve member reaching its rest position.

* * * * *